(12) United States Patent
Maskaliunas et al.

(10) Patent No.: US 9,995,396 B1
(45) Date of Patent: Jun. 12, 2018

(54) OUTWARDLY SEALING PUMPING SEAL ASSEMBLY

(71) Applicant: Aktiebolaget SKF, Gothenburg (SE)

(72) Inventors: Linas Maskaliunas, Geneva, IL (US);
Mahmoud Zandieh, Wheaton, IL (US);
Dave Templin, Elgin, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days. days.

(21) Appl. No.: 15/378,263

(22) Filed: Dec. 14, 2016

(51) Int. Cl.
*F01D 11/02* (2006.01)
*F16J 15/3232* (2016.01)
*F16J 15/447* (2006.01)
*F16J 15/00* (2006.01)

(52) U.S. Cl.
CPC ......... *F16J 15/3232* (2013.01); *F16J 15/002* (2013.01); *F16J 15/447* (2013.01)

(58) Field of Classification Search
CPC ...... F16J 15/3232; F16J 15/002; F16J 15/447; F16J 15/025; F16J 15/3204; F16J 15/3236
USPC ............... 277/351, 309, 349, 353, 394, 402
See application file for complete search history.

(56) References Cited

U.S. PATENT DOCUMENTS

| | | | | |
|---|---|---|---|---|
| 3,501,155 A * | 3/1970 | Dega | .................... | F16J 15/3244 277/309 |
| 5,022,659 A * | 6/1991 | Otto | ........................ | F16C 19/34 277/309 |
| 5,096,207 A * | 3/1992 | Seeh | .................... | F16J 15/3256 277/353 |
| 5,211,406 A * | 5/1993 | Katzensteiner | ...... | F16J 15/3256 277/351 |
| 6,450,503 B1 * | 9/2002 | Dossena | .............. | F16J 15/3256 277/549 |
| 6,471,211 B1 * | 10/2002 | Garnett | .................... | F16C 19/34 277/351 |
| 8,342,535 B2 * | 1/2013 | Lattime | ............... | F16C 33/7813 277/409 |
| 2008/0128997 A1 * | 6/2008 | Berdichevsky | ...... | F16J 15/3264 277/366 |
| 2012/0126490 A1 * | 5/2012 | Maskaliunas | ............ | F16J 15/48 277/572 |

* cited by examiner

*Primary Examiner* — Nathan Cumar
(74) *Attorney, Agent, or Firm* — Mark Ussai; SKF USA Inc. Patent Dept.

(57) ABSTRACT

A seal assembly is for sealing between a shaft and a body rotatable about an axis extending through the shaft and includes an annular elastomeric sealing member disposeable within the body bore and coupleable with the shaft. The sealing member has a centerline coaxial with the shaft axis and a radially-outwardly extending, generally annular lip sealingly engageable with an inner circumferential surface of the bore or of a member disposed within the bore so as to define a seal interface. The sealing lip is configured to displace fluid within the sealing interface generally axially out of the interface when the hub rotates about the shaft. Preferably, the sealing member is coupled with an inner casing and disposed within an outer casing, the seal lip sealing against the outer casing inner surface, and a second sealing lip is coupled with the outer casing and seals against the inner casing outer surface.

16 Claims, 10 Drawing Sheets

OUTWARDLY SEALING PUMPING SEAL ASSEMBLY

BACKGROUND OF THE INVENTION

The present invention relates to seals, and more particularly to radial lip seals.

Radial lip seals are known and include at least one lip for sealing inwardly against an outer surface of a shaft or sleeve on the shaft, or outwardly against an inner surface of a bore or sleeve/body within the bore. Certain seal assemblies include inner and outer casings such the sealing member is enclosed within the casing and is installed on the shaft and within the bore as a "unitized" seal assembly.

SUMMARY OF THE INVENTION

In one aspect, the present invention is a seal assembly for sealing between a shaft and a body rotatable about a central axis extending through the shaft, the body having a bore. The seal assembly comprises a generally annular elastomeric sealing member disposeable within the body bore and coupleable with the shaft. The sealing member has a centerline generally coaxial with the shaft axis and a radially-outwardly extending, generally annular lip sealingly engageable with an inner circumferential surface of the bore or of a member disposed within the bore so as to define a seal interface. The sealing lip is configured to displace fluid within the sealing interface generally axially out of the interface when the hub rotates about the shaft.

In another aspect, the present invention is again a seal assembly for sealing between a shaft and a body rotatable about the shaft, the body having a bore. The seal assembly comprises an inner annular casing disposeable upon the shaft and an outer annular casing disposed about the inner casing, coupleable with the body bore and having an inner circumferential surface. A generally annular elastomeric sealing member is coupled with the inner casing and is disposed within the outer casing. The sealing member has a radially-outwardly extending, generally annular lip sealingly engageable with the inner circumferential surface of the outer casing so as to define a seal interface. The sealing member lip is configured to displace fluid within the seal interface generally axially out of the interface when the body rotates about the shaft.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
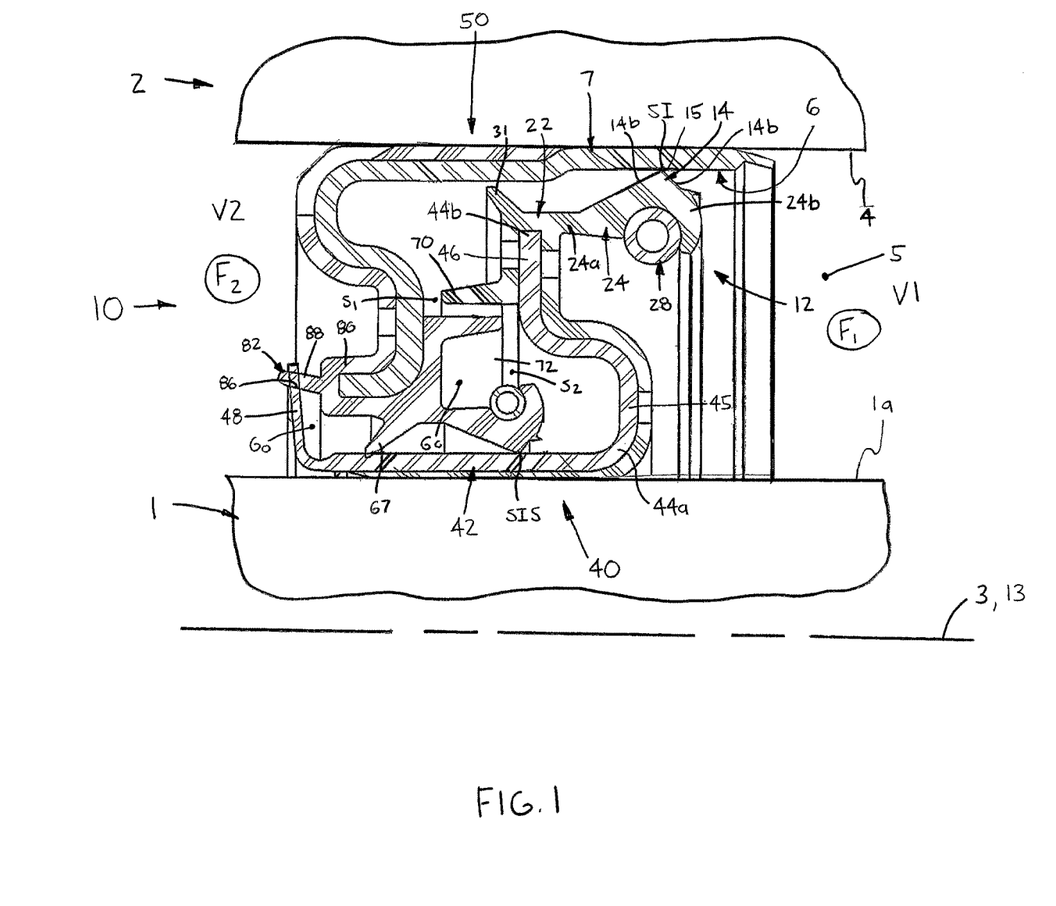
FIG. 1 is a broken-away, axial cross-sectional view of a seal assembly in accordance with the present invention, shown mounted on a shaft and within a bore.

Referring now to the drawings in detail, wherein like numbers are used to indicate like elements throughout, there is shown in FIGS. 1-11 a seal assembly 10 for sealing between a shaft 1 and a body 2, preferably a wheel hub, rotatable about a central axis 3 extending through the shaft 1, the body 2 having an inner circumferential surface 4 defining a bore 5. The seal assembly 10 substantially prevents fluid flow between a first volume V1 containing a first, higher pressure fluid $F_1$ (e.g., oil) and a second volume V2 containing a second, lower pressure fluid $F_2$ (e.g., air), as indicated in FIG. 1. The seal assembly 10 basically comprises a generally annular elastomeric sealing member 12 having a centerline 13 generally coaxial with axis 3, the member 12 being disposeable within the body bore 5 and coupleable with the shaft 1. The sealing member 12 has a radially-outwardly extending, generally annular lip 14 extending circumferentially about the centerline 13 and has an outer circumferential sealing edge 15 defined between a lip front face 14a and a lip rear face 14b. The seal lip 14 is sealingly engageable with an inner circumferential surface 4 of the bore 5, or more preferably against the inner surface 6 of a member 7 disposed within the bore 5 (as depicted), so as to define a seal interface S1. The seal lip 14 is configured to displace or "pump" fluid within the sealing interface SI generally axially out of the interface SI, preferably toward the higher pressure volume V1 or the "oil side" of the seal assembly 10, when the body or hub 2 rotates about the shaft 1.

Figure 8:
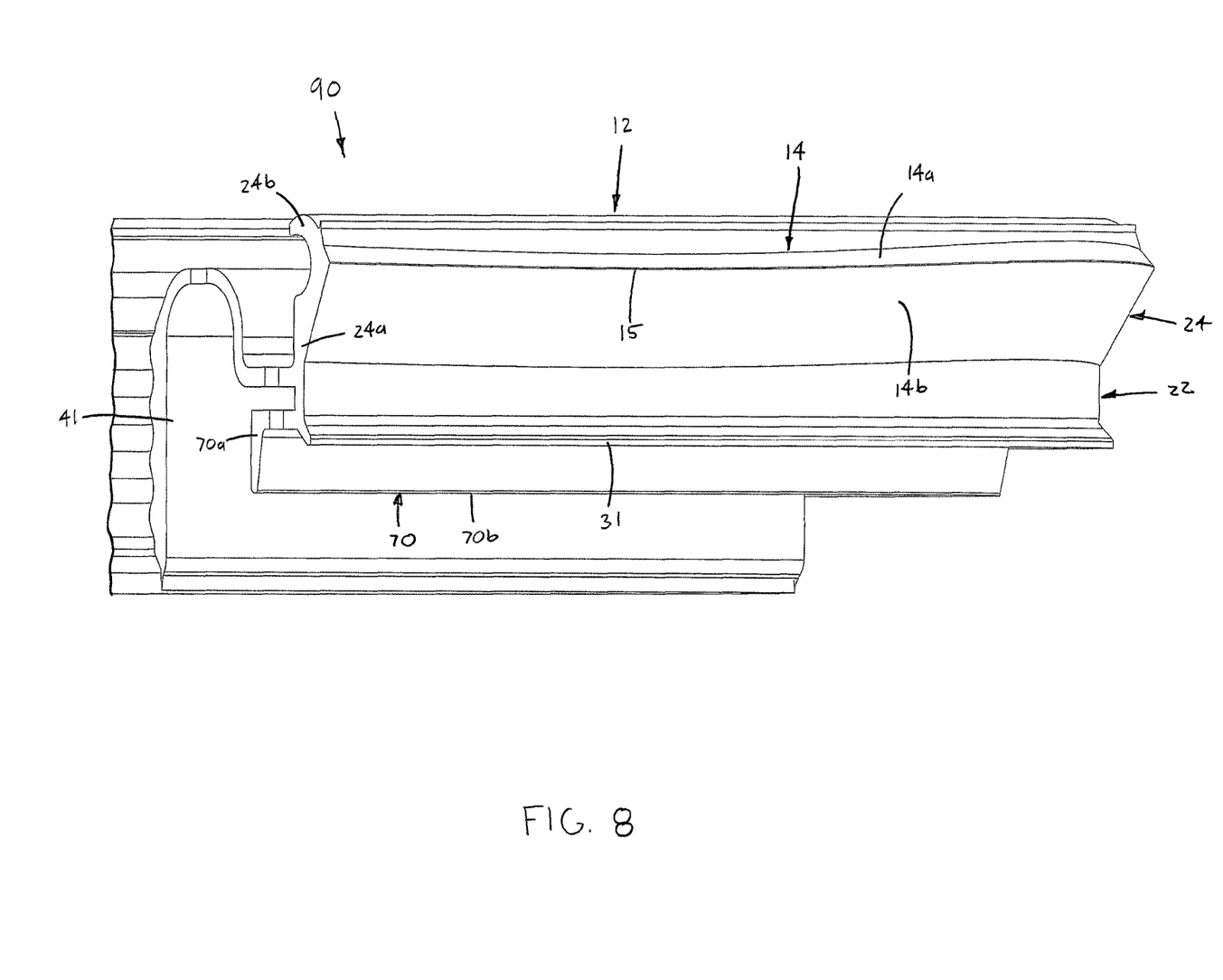
FIG. 8 is a broken-away, perspective view of an inner unitary elastomer member, including an outer-sealing wave seal lip.
Figure 11:
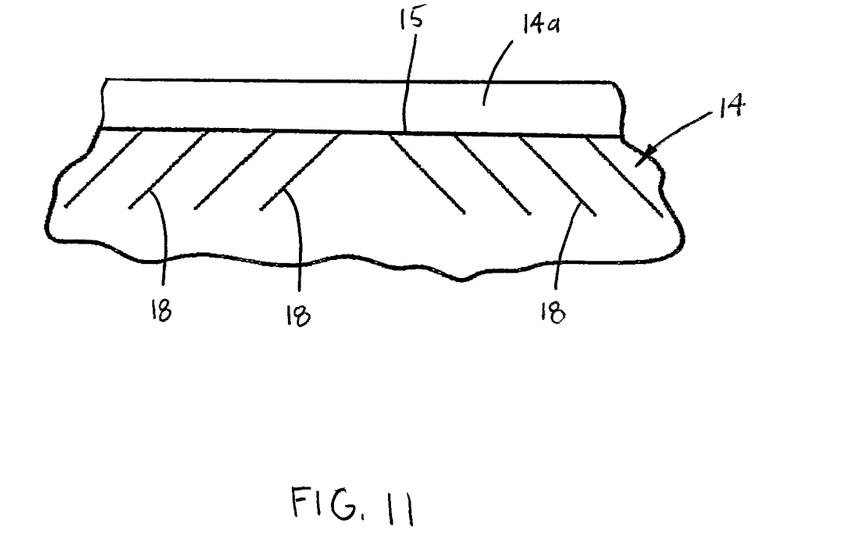
FIG. 11 is a broken-away, plan view of a seal lip having recesses.

Preferably, the seal lip 14 is extends generally sinuously or sinusoidally about the centerline 13 so as to form a "wave-like" lip profile, as best shown in FIG. 8, such that the inner portions of the wave lip edge 15 push fluid axially outwardly toward the wave crests, and thereafter out of the seal interface SI and preferably into the seal oil side V1, as the bore inner surface 4, or body inner surface 6, slides against the lip 14. However, the seal lip 14 may instead be shaped like a conventional radial lip seal but including at least one and preferably a plurality of projections 16 (FIG. 10), or recesses 18 (FIG. 11), extending at least partially axially along the lip rear face 14b of the lip 14. Such projections 16 or recesses 18 function to direct fluids contacting the projection/recess to displace axially or "pump" out of the seal interface SI, and may extend sinusoidally (FIG. 10), substantially axially (not shown), or both axially and radially (FIG. 11).

Further, the sealing member 12 preferably includes a base portion 22 coupleable with the shaft 1 and a cantilever portion 24 extending generally axially from the base portion 22. The cantilever portion 24 has a first end 24a integrally connected with the base portion 22 and an opposing, free end 24 providing the sealing lip 14. Also, the seal assembly 10 preferably further comprises a generally annular biasing member 28, preferably a garter spring, disposed within the cantilever portion 24 of the sealing member 12. Preferably, the sealing member cantilever portion 24 has opposing inner and outer circumferential surfaces 25A, 25B and a recess 30 extending radially outwardly from the inner surface 25A. As such, the biasing member 28 is preferably disposed within the recess 30, but may alternatively be disposed against an inner surface 25A formed without a recess. In any case, the biasing member 28 is configured to bias the cantilever portion free end 24b generally radially outwardly to maintain contact between the sealing lip 14 and the inner circumferential surface 4 of the bore 5 or the inner surface 6 of a member 7 disposed within the bore 5 (as preferred). Furthermore, the sealing member 12 also preferably includes a dust lip 31 extending from the base portion 22 generally in an axial direction opposite from the cantilever portion 24.

Referring to FIGS. 1-6, the seal assembly 10 preferably includes at least an inner casing 40 configured to couple the sealing member 12 with the shaft 1. More specifically, the inner casing 40 preferably includes an axial portion 42 mountable on the shaft 1 and a radial portion 44 extending radially outwardly from the axial portion 42, the sealing member 12 being disposed on the radial portion 44. The axial portion 42 has opposing first and second axial ends 42a, 42b and inner and outer circumferential surfaces 43A, 43B, the inner surface 43B being frictionally engageable with the outer surface 1a of the shaft 1 and preferably includes an inner elastomeric layer 41 to increase friction. Further, the radial portion 44 has an inner end 44a integrally formed with the axial portion first end 42a and an outer, free end 44b, the seal base portion 22 being molded to the free end 44b. Preferably, the inner casing radial portion 44 is formed having an inner bended section 45 and an outer straight section 46 such that the outer end 44b is spaced axially inwardly from the inner end 44a. Furthermore, the inner casing 40 also preferably includes a second radial portion 48 extending radially outwardly from the axial portion second end 44b and having opposing inner and outer radial surfaces 49A, 49B, for purposes discussed in greater detail below.

Referring to FIGS. 1-5 and 7, the seal assembly 10 is preferably a "unitized seal" that further includes an outer casing 50, with the sealing member 12 and biasing member 28 being disposed within the casings 40, 50. The outer casing 50 has an axial portion 52 with inner and outer circumferential surfaces 51, 53 and opposing first and second axial ends 52a, 52b and a radial portion 54 extending radially inwardly from the second axial end 52b. The outer casing outer surface 53 is frictionally engageable with the body bore 5 to rotatably couple the outer casing 50 with the body 2, and the sealing member lip 14 is engageable with the outer casing inner surface 51, which provides inner surface 6 as discussed above. Preferably, the outer casing axial portion 52 has an elastomeric layer 56 on a first section 53a of the outer circumferential surface 53 so as to define a second, uncovered section 53b of the outer surface 53. The sealing member 12 is sized and oriented such that the lip 14 is engageable with a section 51a of the casing axial portion inner surface 51 spaced inwardly of the uncovered section 53b of the outer surface 53. As such, the elastomeric layer 56 increases frictional force retaining the outer casing 50 within the body bore 5, while the engagement of the lip 14 with the casing inner surface section 51a spaced inwardly from the uncovered outer surface section 53b enables heat generated within the seal interface SI to more efficiently conduct through the outer casing 50.

Further, the outer casing radial portion 54 has an outer end 54a integrally formed with the axial portion second end 52b and an inner free end 54b. The outer casing radial portion 54 is spaced axially from the inner casing first radial portion 44 so as to define a central axial gap $G_C$ and from the inner casing second radial portion 48 so as to define an outer axial gap $G_O$. Preferably, the outer casing radial portion 54 is formed with generally S-shaped axial cross-sections with an outer bended section 55 and an inner bended section 57, such that the free end 54b is disposed inwardly of and extends generally axially toward the inner casing second radial portion 48.

Preferably, the seal assembly 10 further comprises a second elastomeric sealing member 60 coupled with the outer casing radial portion 54, and functions to contain fluid F1 (e.g., oil) leaking past the primary seal lip 14. As such, the seal assembly 10 is a dual, inner and outwardly sealing seal assembly. The second or "secondary" sealing member 60 has a generally annular sealing lip 62 engageable with the inner casing outer circumferential surface 43B so as to provide a secondary sealing interface SSI. As with the lip 14 of the primary sealing member 12, the lip 62 is preferably configured to axially displace fluid within the secondary sealing interface SIS, and is most preferably formed with a sinuous lip profile as described above. However, the secondary seal lip 62 may instead be formed as a generally conventional radial lip seal without any axial "pumping" functionality. Further, the second sealing member 60 preferably includes a base portion 64 molded to the outer casing radial portion 56 and a cantilever portion 66 having a first end 66a integrally connected with the base portion 64 and an opposing, free end 66b providing the second sealing lip 62. Preferably, the second sealing member 60 also has a dust lip 67 extending from the base portion 64 in a direction generally axially opposite the cantilever portion 66. Also, a biasing member 68, preferably a garter spring, is disposed about the cantilever portion 66 of the second sealing member 60 and functions to bias the sealing lip 62 radially-inwardly against the inner casing outer surface 43B. Although the second sealing member 62 is preferred, the seal assembly 10 may alternatively be a single seal sealing assembly with only the main or "primary" sealing member 12.

Referring to FIGS. 1-9, the seal assembly 10 preferably further comprises first and second cantilever members 70, 72 forming a labyrinth seal 74 within the central axial gap $G_C$. The first cantilever member 70 has a first end 70a connected with the inner casing first radial portion 44 and a second, free end 72b spaced axially from the first end 70a and located generally adjacent to the outer casing radial portion 56 so as to provide a first, relatively narrow clearance space $S_1$. The second cantilever member 74 has a first end 72a connected with the outer casing radial portion 56 and a second, free end 72b spaced axially from the first end 72a and located generally adjacent to the inner casing first radial portion 44 so as to define a second, relatively narrow clearance space $S_2$. The second cantilever 72 is spaced radially from the first cantilever member 74 such that a generally sinuous, tortuous path is defined about the two members 70, 72 to provide the labyrinth seal 74 to inhibit the passage of solids within the central axial gap $G_C$.

Referring now to FIGS. 1-4, 7 and 9, the seal assembly 10 preferably further includes a generally cantilever bumper 80 having a first end 80a connected with the outer casing radial portion 56 and an opposing free end 80b located adjacent to the inner casing second radial portion 48. As such, the bumper 80 defines a relatively narrow clearance space $S_3$ and generally obstructs the outer axial gap $G_O$, and particularly functions to prevent solids from passing through to the secondary sealing interface SIS. Preferably, the bumper 80 includes at least one and preferably a plurality of projections 82 extending generally axially outwardly from the bumper free end 80b and toward the inner casing second radial portion 48. The projections 82 prevent the remainder of the bumper 80 from contacting the inner casing second radial portion 48, particularly during mounting of the seal assembly 10 within the bore 5 and inserting the shaft 1 into the seal assembly 10, so as to maintain the clearance space $S_3$.

Figure 2:
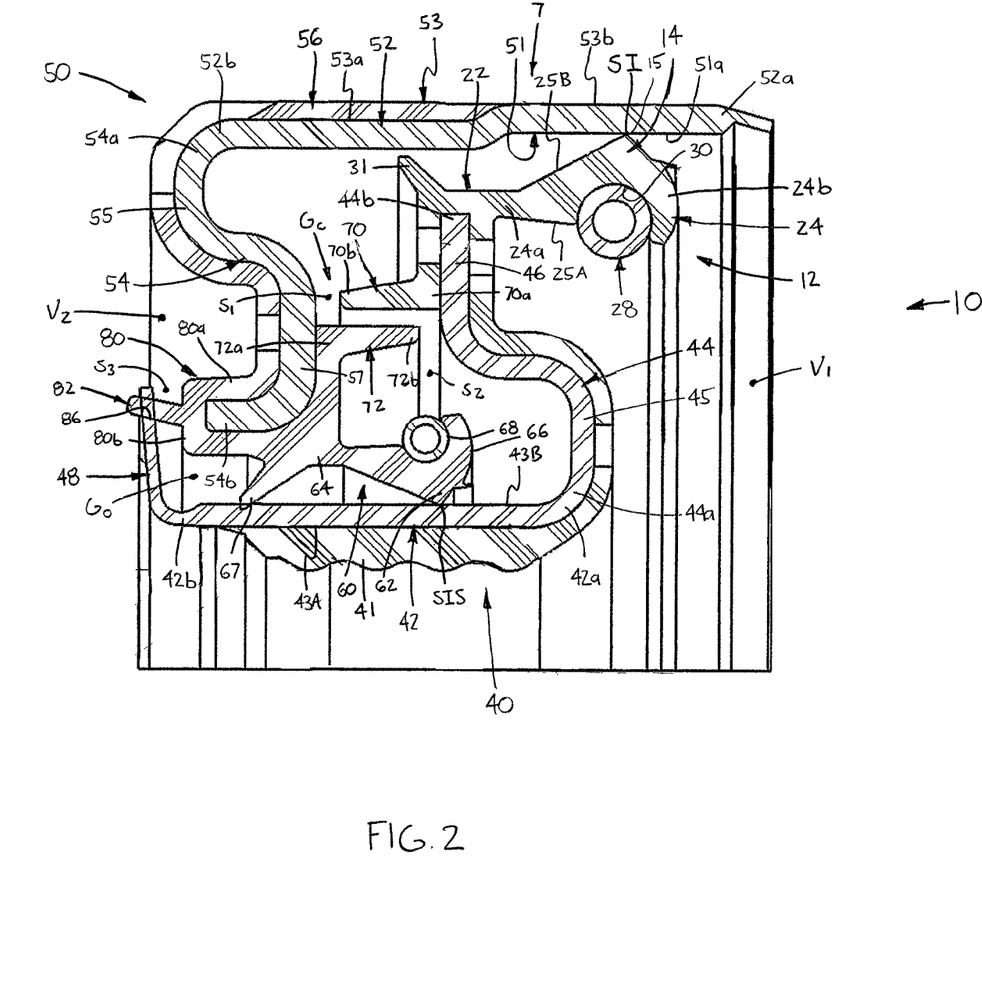
FIG. 2 is another view of the seal assembly shown in FIG. 1, shown separate from the shaft and bore.
Figure 3:
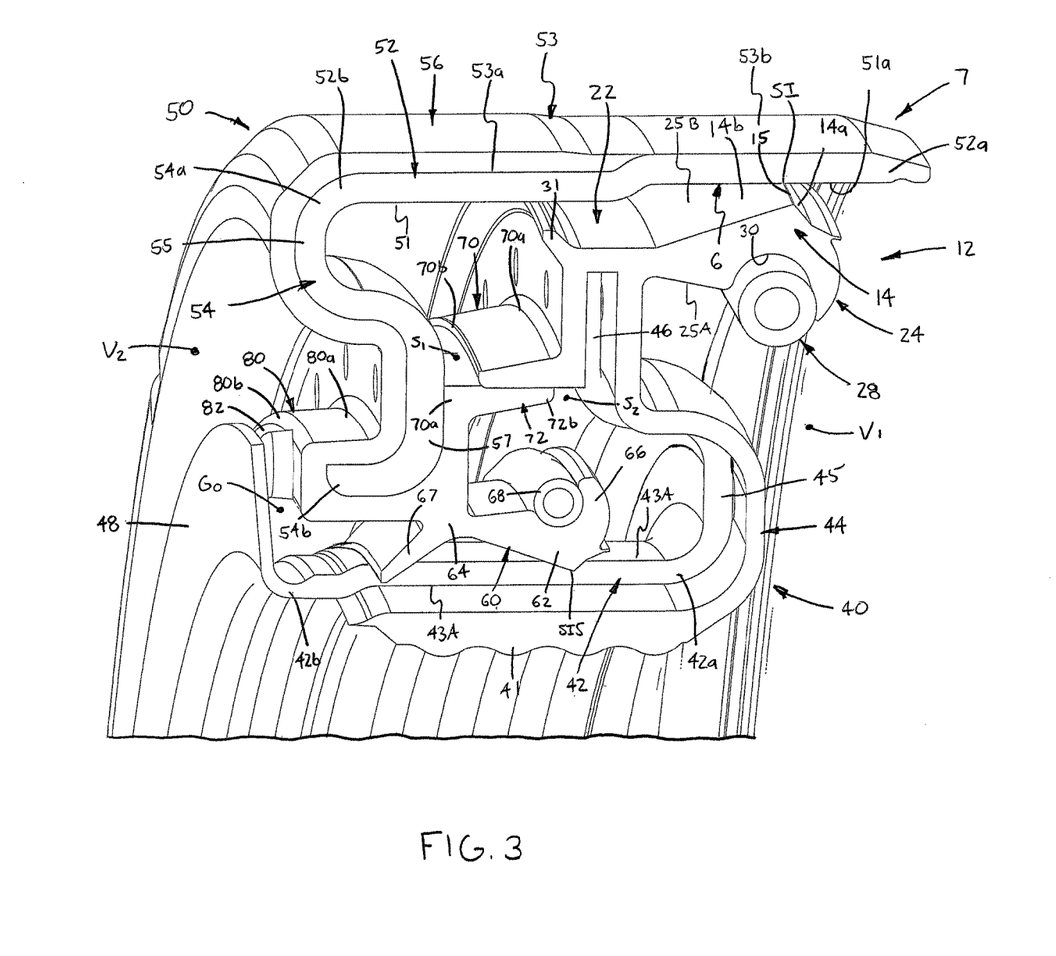
FIG. 3 is a broken-away, perspective view in partial axial cross-section, taken generally from a first axial end of the seal assembly.
Figure 4:
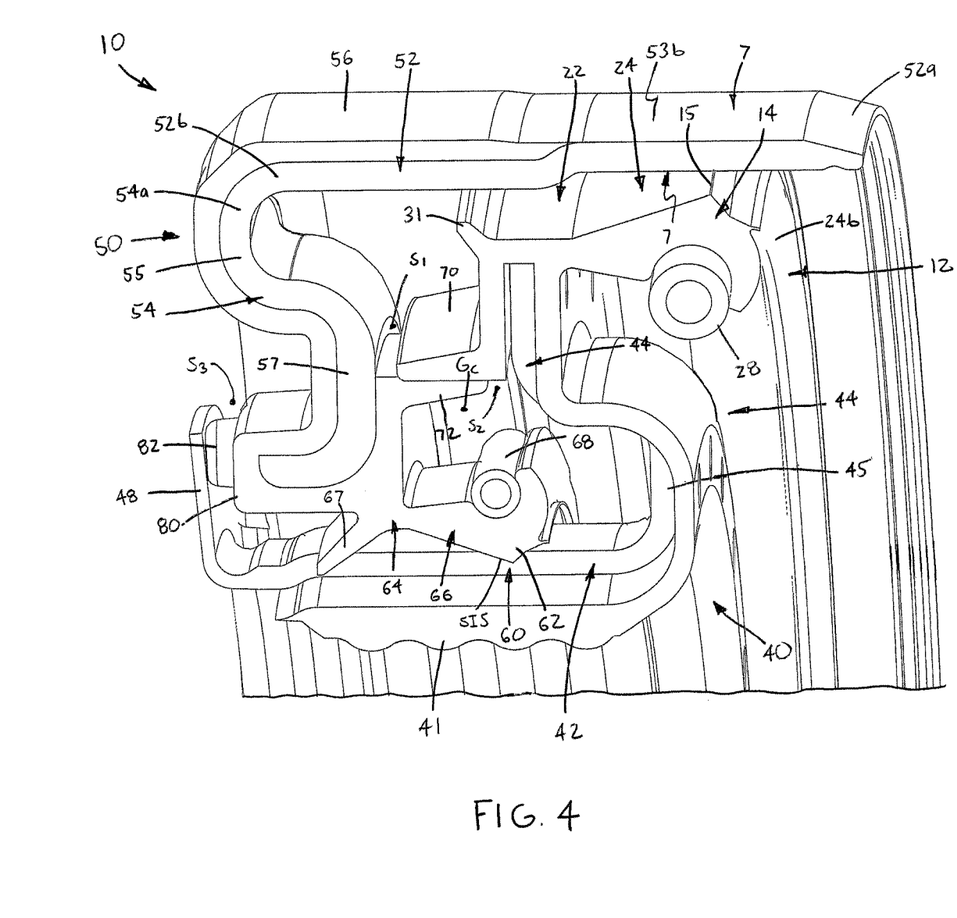
FIG. 4 is a broken-away, perspective view in partial axial cross-section, taken generally from a second axial end of the seal assembly.
Figure 5:
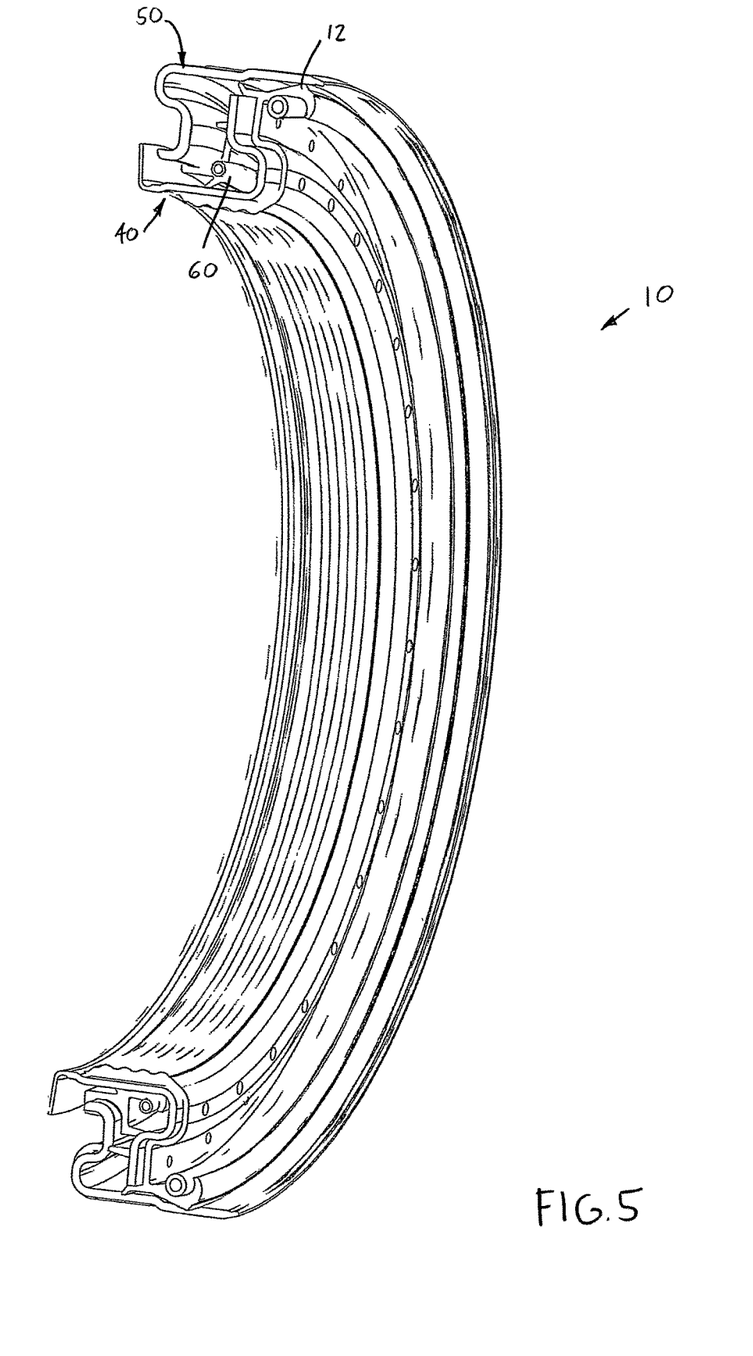
FIG. 5 is an axial cross-sectional view of half of the seal assembly.
Figure 9:
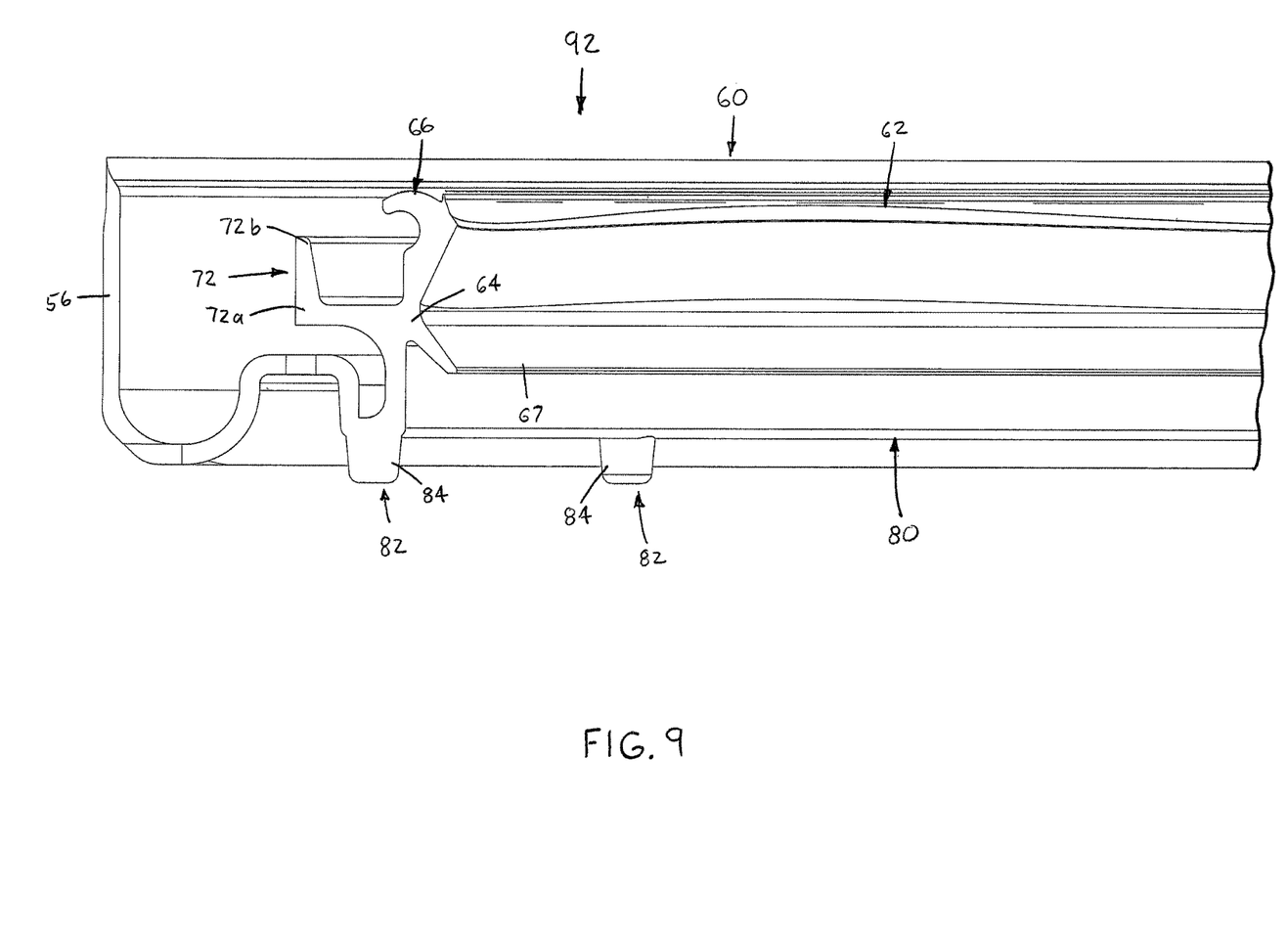
FIG. 9 is a broken-away, perspective view of an outer unitary elastomer member, including an inner-sealing wave seal lip.
Figure 10:
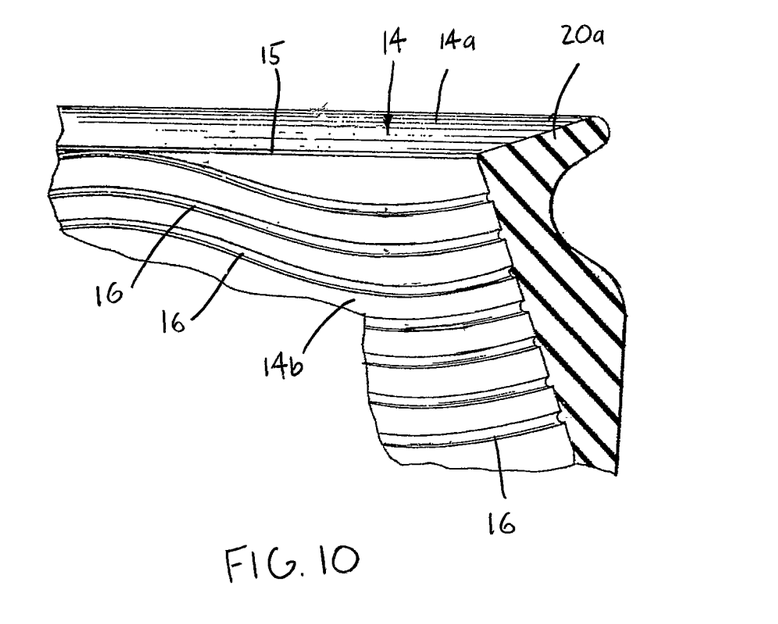
FIG. 10 is a broken-away, plan view in partial cross-section of a seal lip having projections.

In the construction shown in FIGS. 3, 4 and 9, each projection 82 is formed as a relatively short circular cylinder 84 attached to the bumper 80 by a reduced diameter neck portion (not depicted) and has a free end 84a that contacts the inner surface 49A of the inner casing radial portion 48. During the initial use of the seal assembly 10, friction between the cylinder ends 84a and the radial portion inner surface 49A causes the reduced diameter neck portions to shear and detach the cylinders 84 from the bumper 80, thereby eliminating friction between the bumper 80 and the inner casing 40. In the construction shown in FIGS. 1, 2, 6 and 7, the inner casing second radial portion 48 includes at least one and preferably at least two cut-outs 86 (one shown) extending through the inner and outer surfaces 49A, 49B. Also, each projection 80 is formed as a relatively thin cylindrical projection 88 having a length slightly greater than the width of the clearance gap $S_3$, such that each projection 88 is bended against (arrangement not shown) the radial portion inner surface 49A. During the initial use of the seal assembly 10, the relative angular displacement of the casing radial portion 48 and the bumper 80 causes each projection 88 to sequentially unbend and project into one of the cut-outs 86, as shown in FIGS. 1 and 2. Thereafter, an edge of the cut-out 86 shears off an outer portion of the cylindrical projection 88 to thereby eliminate contact between the projections 88 and the radial portion inner surface 49A, and thus also eliminate friction between the bumper 80 and the inner casing 40.

Figure 6:
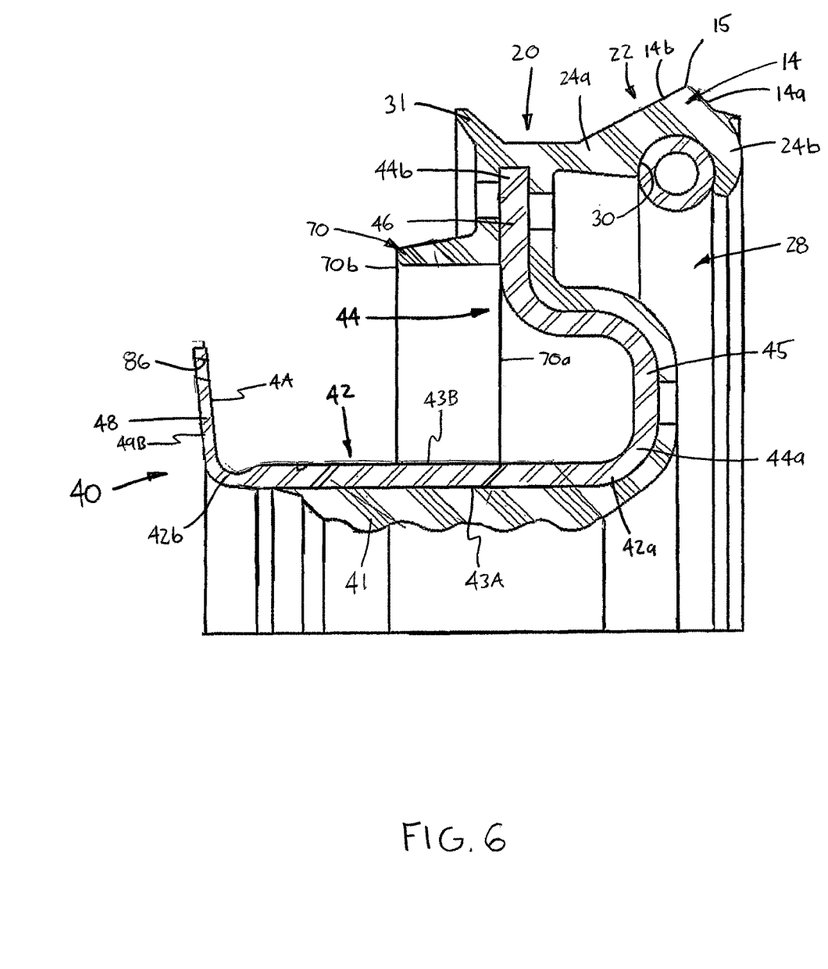
FIG. 6 is a broken-away, axial cross-sectional view of an inner seal assembly.
Figure 7:
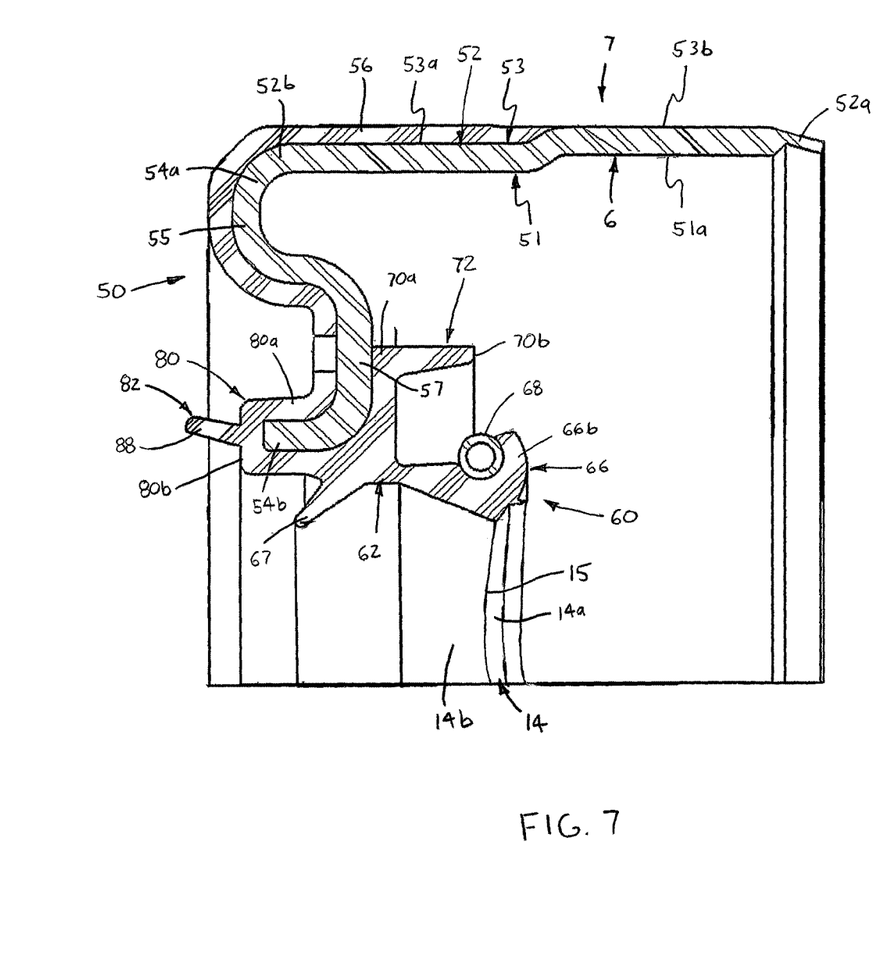
FIG. 7 is a broken-away, axial cross-sectional view of an outer seal assembly.

Referring to FIGS. 6-9, the seal assembly 10 is preferably manufactured by providing inner and outer unitary elastomer members 90, 92 each providing the elastomeric components mounted to the inner casing 40 and the outer casing 50, respectively. Specifically, the inner unitary elastomeric member 90 as best shown in FIGS. 6 and 8 includes the primary sealing member 12, the first cantilever member 70, and the inner elastomeric layer 41. The inner unitary member 90 is connected with the inner casing 40, preferably by molding but may be attached by any other appropriate means, such as adhesives, fasteners, etc. Further, the outer unitary elastomeric member 92, best shown in FIGS. 7 and 9, includes the secondary sealing member 60, the second cantilever member 72, the bumper 80 and projections 82, and the outer elastomeric layer 56. However, each of these above-noted elastomeric components may be separately formed and coupled with the inner casing 40 or the outer casing 50 by any appropriate means.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:
1. A seal assembly for sealing between a shaft and a body rotatable about a central axis extending through the shaft, the body having a bore, the seal assembly comprising:
   a first generally annular elastomeric sealing member disposeable within the body bore and coupleable with the shaft, the sealing member having a centerline generally coaxial with the shaft axis and including a base portion coupleable with the shaft and a cantilever portion extending axially from the base portion and having a first end integrally connected with the base portion and an opposing, free end providing a radially-outwardly extending, generally annular primary seal lip sealingly engageable radially outwardly with an inner circumferential surface of the bore or of a member disposed within the bore so as to define a seal interface, the sealing lip being configured to displace fluid within the sealing interface generally axially out of the interface when the hub rotates about the shaft;
   an inner casing engageable with the shaft, the first sealing member base portion being attached to the inner casing so as to couple the sealing member with the shaft;
   an outer casing having outer and inner circumferential surfaces, the outer casing outer surface being engageable with the body bore to rotatably couple the outer casing with the body and the first sealing member lip being engageable with the outer casing inner surface, the outer casing including an axial portion providing the inner and outer circumferential surfaces and a radial portion extending inwardly from the axial portion; and
   a second elastomeric sealing member including a base portion attached to the outer casing radial portion and a cantilever portion extending axially from the base portion and having a first end integrally connected with the base portion and an opposing free end providing a generally annular seal lip sealingly engageable radially inwardly with the inner casing outer circumferential surface so as to provide a secondary seal, the second member cantilever portion extending in the same axial direction as the first member cantilever portion such that the second member seal lip is configured to contain fluid leaking past the first member seal lip.
2. The seal assembly as recited in claim 1 wherein one of:
   the seal lip extends generally sinusoidally about the central axis;
   the seal lip includes at least one projection extending at least partially axially; and the seal lip includes at least one recess extending at least partially axially.

3. The seal assembly as recited in claim 1 further comprising a generally annular biasing member disposed within the cantilever portion of the first sealing member and configured to bias the cantilever portion free end generally radially outwardly to maintain contact between the sealing lip and the inner circumferential surface of the bore or the member disposed within the bore.

4. The seal assembly as recited in claim 1 wherein:
the outer casing includes an axial portion providing the inner and outer circumferential surfaces and a radial portion extending inwardly from the axial portion;
the inner casing includes an axial portion providing the inner and outer circumferential surfaces and a radial portion extending outwardly from the axial portion and spaced axially from the outer casing radial portion so as to define an axial gap, the elastomeric sealing member being connected with the inner casing radial portion; and
the seal assembly further includes a first cantilever member having a first end connected with the inner casing radial portion and a second, free end spaced axially from the first end and located generally adjacent to the outer casing radial portion and a second cantilever member having a first end connected with the outer casing radial portion and a second, free end spaced axially from the first end and located generally adjacent to the inner casing radial portion and spaced radially from the first cantilever member such that the first and second cantilever members form a labyrinth seal within the axial gap.

5. The seal assembly as recited in claim 1 wherein:
the inner casing includes an axial portion providing the inner and outer circumferential surfaces and having opposing first and second ends, a first radial portion extending outwardly from the axial portion first end, the elastomeric sealing member being connected with the inner casing first radial portion, and a second radial portion extending outwardly from the axial portion second end;
the outer casing includes an axial portion providing the inner and outer circumferential surfaces and a radial portion extending inwardly from the axial portion; and
the seal assembly further includes a generally cantilever bumper having a first end connected with the outer casing radial portion and an opposing free end located adjacent to the inner casing second radial portion.

6. The seal assembly as recited in claim 5 wherein the bumper includes at least one projection extending generally axially from the bumper free end and disposeable against the inner casing second radial portion so as to prevent contact between a remainder of the bumper and the inner casing second radial portion.

7. The seal assembly as recited in claim 1 wherein the casing axial portion has an elastomeric layer on a first section of the outer circumferential surface so as to define a second, uncovered section of the outer surface, the sealing member lip being engageable with a section of the axial portion inner surface spaced inwardly of the uncovered section of the outer surface.

8. A seal assembly for sealing between a shaft and a body rotatable about the shaft, the body having a bore, the seal assembly comprising:
an inner annular casing disposeable upon the shaft;
an outer annular casing disposed about the inner casing, coupleable with the body bore and having an inner circumferential surface; and
a generally annular elastomeric sealing member coupled with the inner casing and disposed within the outer casing, the sealing member including a base portion coupled with the inner casing and a cantilever portion extending axially from the base portion and having a first end integrally connected with the base portion and an opposing, free end providing a radially-outwardly extending, generally annular lip sealingly engageable radially outwardly with the inner circumferential surface of the outer casing so as to define a seal interface, the sealing member lip being configured to displace fluid within the seal interface generally axially out of the interface when the body rotates about the shaft; and
a second elastomeric sealing member including a base portion coupled with the outer casing and a cantilever portion extending axially from the base portion and having a first end integrally connected with the base portion and an opposing free end providing a radially-inwardly generally annular sealing lip sealingly engageable radially inwardly with the inner casing outer circumferential surface so as to provide a secondary seal, the second sealing member cantilever portion extending in the same axial direction as the first sealing member cantilever portion such that the secondary seal lip is configured to contain fluid leaking past the primary seal lip.

9. The seal assembly as recited in claim 8 wherein one of:
the sealing lip extends generally sinusoidally about the central axis; and
the sealing lip includes at least one projection extending at least partially axially or at least one recess extending at least partially axially.

10. The seal assembly as recited in claim 8 further comprising a generally annular biasing member disposed within the cantilever portion of the biasing member and configured to bias the cantilever portion free end generally radially outwardly to maintain contact between the sealing lip and the inner circumferential surface of the bore or member.

11. The seal assembly as recited in claim 8 wherein the inner casing has opposing inner and outer circumferential surfaces, the outer circumferential surface being frictionally engageable with an outer surface of the shaft so as to connect the inner casing with the shaft and the outer casing further has an outer circumferential surface frictionally engageable with the bore inner surface so as to connect the outer casing with the body.

12. The seal assembly as recited in claim 8 wherein:
the outer casing includes an axial portion providing the inner circumferential surface and a radial portion extending inwardly from the axial portion;
the inner casing includes an axial portion having inner and outer circumferential surfaces and a radial portion extending outwardly from the axial portion and spaced axially from the outer casing radial portion so as to define an axial gap, the elastomeric sealing member being connected with the inner casing radial portion; and
the seal assembly further includes a first cantilever member having a first end connected with the inner casing radial portion and a second, free end spaced axially from the first end and located generally adjacent to the outer casing radial portion and a second cantilever member having a first end connected with the outer casing radial portion and a second, free end spaced axially from the first end and located generally adjacent to the inner casing radial portion and spaced radially from the first cantilever member such that the first and second cantilever members form a labyrinth seal within the axial gap.

13. The seal assembly as recited in claim 8 wherein:

the inner casing includes an axial portion with inner and outer circumferential surfaces and opposing first and second ends, a first radial portion extending outwardly from the axial portion first end, the elastomeric sealing member being connected with the inner casing first radial portion, and a second radial portion extending outwardly from the axial portion second end;

the outer casing includes an axial portion providing the inner circumferential surface and a radial portion extending inwardly from the axial portion; and the seal assembly further includes a generally cantilever bumper having a first end connected with the outer casing radial portion and an opposing free end located adjacent to the inner casing second radial portion.

14. The seal assembly as recited in claim 13 wherein the bumper includes at least one projection extending generally axially from the bumper free end and disposeable against the inner casing second radial portion so as to prevent contact between a remainder of the bumper and the inner casing second radial portion.

15. The seal assembly as recited in claim 8 wherein the outer casing has an axial portion providing the inner circumferential surface, an opposing outer circumferential surface and an elastomeric layer on a first section of the outer circumferential surface so as to define a second, uncovered section of the outer surface, the sealing member lip being engageable with a section of the axial portion inner surface spaced inwardly of the uncovered section of the outer surface.

16. A seal assembly for sealing between a shaft and a body rotatable about a central axis extending through the shaft, the body having a bore, the seal assembly comprising:

an inner casing including an axial portion engageable with the shaft and having inner and outer circumferential surfaces and a radial portion extending generally radially outwardly from the axial portion and having an outer end;

an outer casing disposeable about the inner casing and having an axial portion with inner and outer circumferential surfaces, the outer casing outer surface being engageable with the body bore to rotatably couple the outer casing with the body, and a radial portion extending radially inwardly from the axial portion, having an inner end and being spaced axially from the inner casing radial portion;

a first generally annular elastomeric sealing member including a base portion attached to the outer end of the inner casing radial portion and a cantilever portion extending axially from the base portion in a first axial direction and having a first end integrally connected with the base portion and an opposing, free end providing a radially-outwardly extending, generally annular primary seal lip sealingly engageable radially outwardly with the outer casing inner circumferential surface, the seal lip having a front face facing in the first axial direction; and a second generally annular elastomeric sealing member including a base portion attached to the inner end of the outer casing radial portion and a cantilever portion extending axially from the base portion in the first axial direction and having a first end integrally connected with the base portion and an opposing free end providing a generally annular seal lip with a front face facing in the first axial direction, the second seal lip being sealingly engageable radially inwardly with the inner casing outer circumferential surface so as to provide a secondary seal, the second member cantilever free end being spaced axially in an opposing, second axial direction from the inner casing radial portion such that any fluid leaking past the first member seal lip is contained by the front face of the second seal lip.

\* \* \* \* \*